Figure 1:
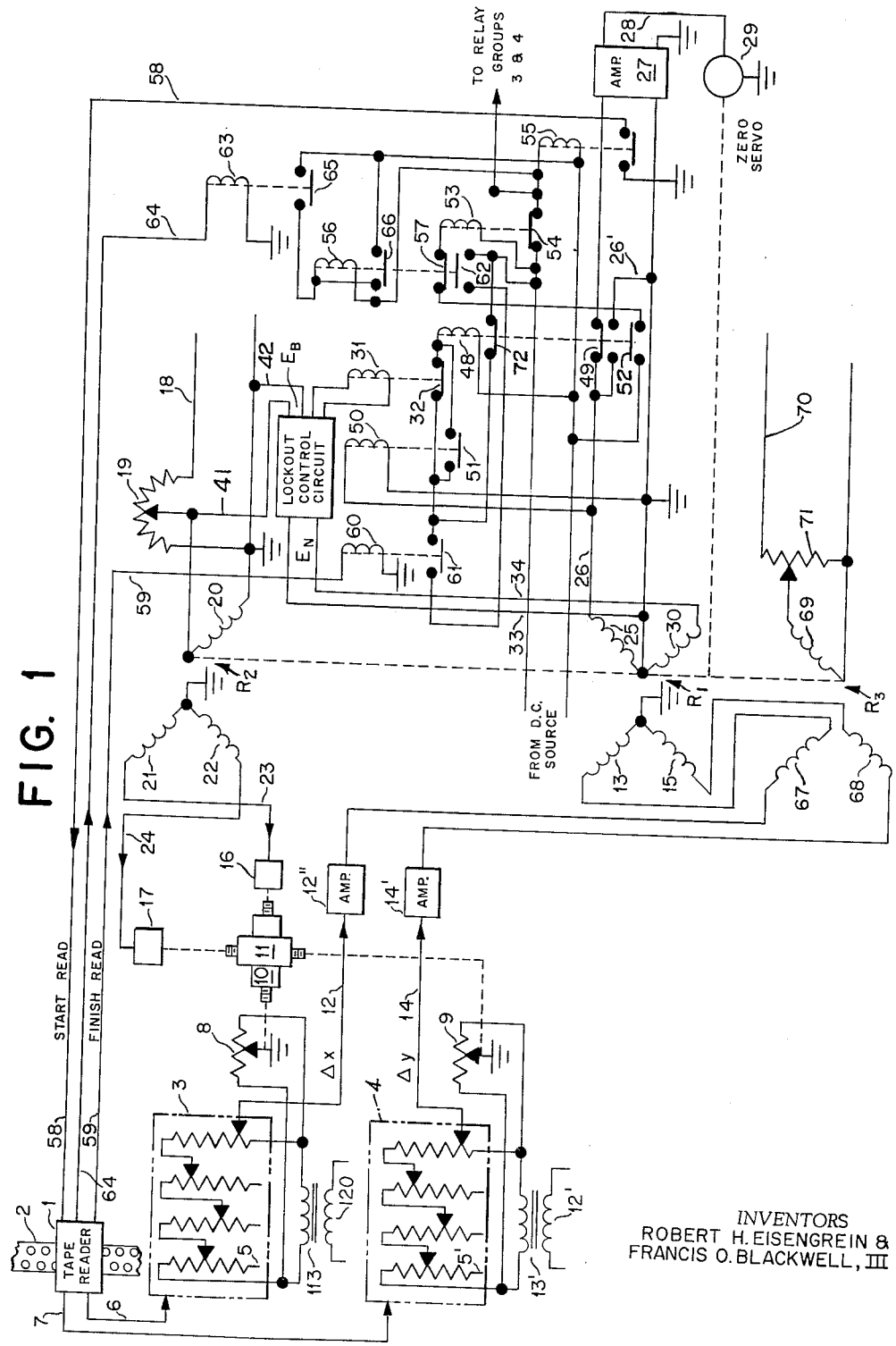

INVENTORS
ROBERT H. EISENGREIN &
FRANCIS O. BLACKWELL, III

June 8, 1965 R. H. EISENGREIN ETAL 3,188,541
CONTOUR TRACING CONTROL DEVICE
Filed July 26, 1962 2 Sheets-Sheet 2

INVENTORS
ROBERT H. EISENGREIN &
FRANCIS O. BLACKWELL, III

United States Patent Office 3,188,541
Patented June 8, 1965

3,188,541
CONTOUR TRACING CONTROL DEVICE
Robert H. Eisengrein, Skaneateles, and Francis O. Blackwell III, Seneca Falls, N.Y., assignors to Seneca Falls Machine Company, Seneca Falls, N.Y.
Filed July 26, 1962, Ser. No. 212,769
9 Claims. (Cl. 318—28)

This invention relates generally to the control art, and more specifically to a new and useful numerical control continuous path contouring system for machine tools and the like.

Our invention is particularly concerned with a continuous path contouring system adapted for tape control, wherein the path is defined by a series of set points, comprising successive target positions toward which the machine tool is driven with a continuously controlled, linear motion.

The reading of digital information from a tape, and conversion thereof to analog information, as contemplated in the system of our invention, requires a finite time. This poses a problem, because during that time there will be a complete loss of control insofar as the tape responsive input is concerned.

Accordingly, a primary object of our invention is to provide a numerical control system in which the tool drive is maintained under control and directed toward its target at all times, and the analog definition of the succeeding target position is established by the time of arrival of the tool at the immediately preceding target position.

Another object of our invention is to provide a numerical control continuous path contouring system in which the tool is constantly corrected to transverse a straight line path between successive target positions, and in which the tool can be caused to traverse a path offset from that which is dictated by the digital input information.

It is also an object of our invention to accomplish the foregoing in a system which is relatively inexpensive and economical in operation, and which is easy to service and readily adaptable to different uses and installations.

A machine control system constructed in accordance with our invention is characterized, in one aspect thereof, by the combination, with a machine part movable along plural axes, means generating a rate of feed signal, means resolving the rate of feed signal into axial components, drive means responsive to the rate of feed components for driving the part along its axes to successive target positions, signal generating means measuring the displacement of the part from its target position along the respective axes, displacement signal responsive means computing the angle from the part to its target, and direction correcting means arranged in controlling relation to the rate of feed resolving means and controlled by the angle computing means for instantaneously zeroing the part on its target, of means responsive to the rate of feed of the part to lock the direction correcting means in its last corrected position a sufficient time prior to arrival of the part at its target position, to enable the establishment of the succeeding target position.

In another aspect thereof, the numerical control system of our invention is characterized by the provision of displacement signal biasing means selectively operable to cause the part to traverse a path having a predetermined offset from the path defined by successive preselected target positions.

Figure 2:
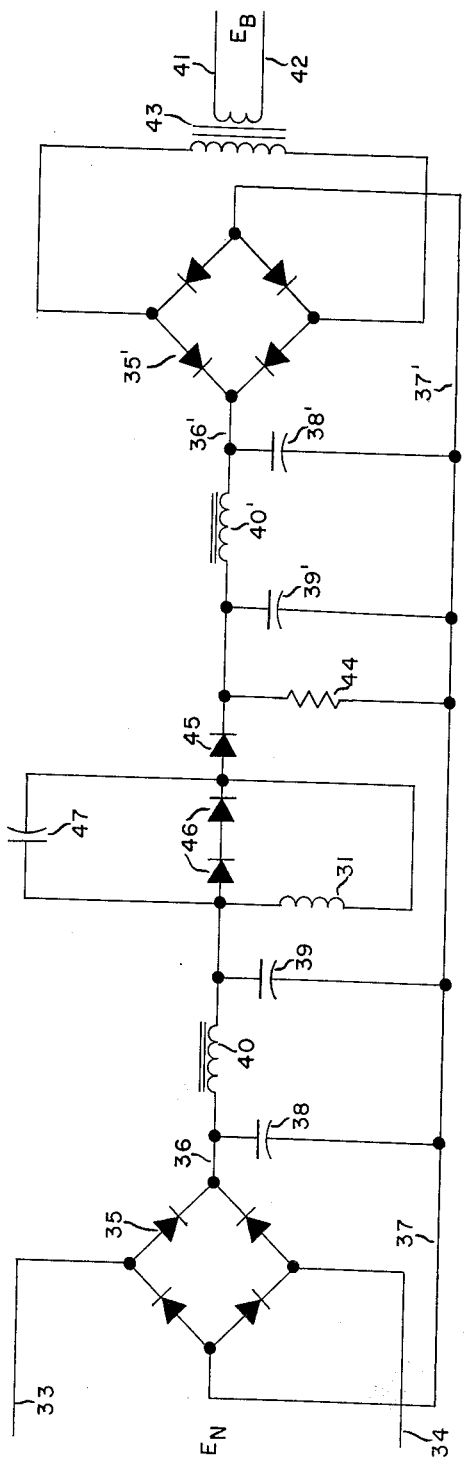
Figure 4:
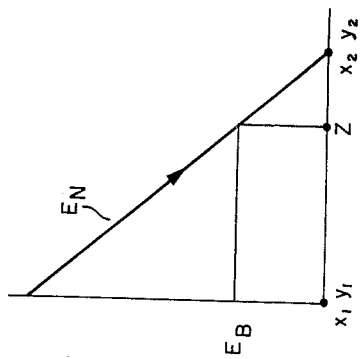
Figure 3:
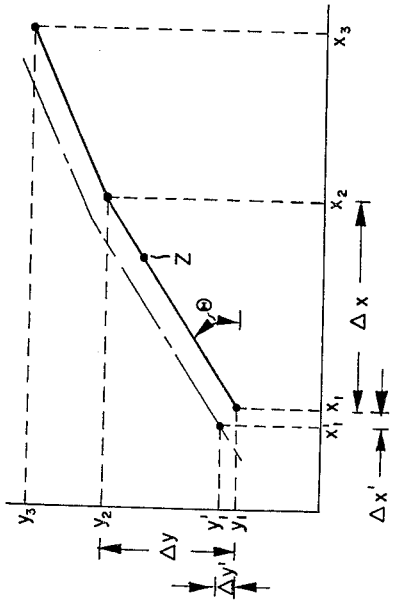

The foregoing and other objects, advantages and characterizing features of the numerical control system of our invention will become clearly apparent from the ensuing detailed description of a presently contemplated embodiment thereof, considered in conjunction with the accompanying drawings illustrating the same wherein:

FIG. 1 is a schematic layout of a numerical control system of our invention;
FIG. 2 is a wiring diagram of the lockout control circuit indicated in FIG. 1;
FIG. 3 is a graphical representation of the operation of our system; and
FIG. 4 is another graphical representation of the operation thereof.

GENERAL SYSTEM OPERATION

Referring now in detail to the illustrative embodiment of our invention which is depicted in the accompanying drawings, the same is shown in conjunction with a conventional tape reading mechanism 1 adapted to read information carried by a tape 2 which can be a standard eight channel tape. The information on tape 2 is in digital form, and is transferred from tape reading mechanism 1 via leads 6 and 7 to groups of high speed relay storage modules 3 and 4, respectively. Relay groups 3 and 4 are of a known type per se, comprising in the illustrated embodiment a series of voltage dividing devices 5 and 5′, respectively.

The function of relay groups 3 and 4 is to convert the digital target position information from tape 2 into analog information, with group 3 defining the desired target position along the X axis, and with group 4 defining the desired target position along the Y axis.

Relay groups 3 and 4 are combined into balance bridge arrangements with potentiometers 8 and 9, respectively, which latter are controlled by the actual position of saddle 10 and table 11, respectively. Saddle 10 is movable along the X axis, and table 11 is carried by saddle 10 for movement therewith along the X axis, while being movable relative thereto along the Y axis. Table 11 carries the tool part (not shown), whose position is being controlled.

Therefore, relay groups 3 and 4 define the desired or pre-selected target position in terms of X and Y coordinates, respectively, while potentiometers 8 and 9 define the actual tool position in terms of its X and Y coordinates. Relay group 3 and potentiometer 8, comprise one balance bridge, energized from source 12ɵ through transformer 113. If the actual position of saddle 10 along the X axis does not correspond to the X axis component of the preselected target position the bridge is unbalanced, producing an output signal ΔX corresponding in amplitude to the magnitude of X axis displacement of the actual tool position from the preselected target position, and in phase to the direction of such displacement. This signal is transmitted via lead 12 to one winding 13 of an angle computing, first resolver R1.

In like manner, the bridge comprising relay group 4 and potentiometer 9 is energized from source 12′ through transformer 13′. Any unbalance in this bridge produces a signal ΔY corresponding in amplitude to the extent of displacement of table 11 from the preselected target position on the Y axis, and in phase to the direction of such displacement. This error signal is transmitted via lead 14 to a winding 15 on resolver R1. Signal amplifiers 12″ and 14′ are provided, if needed.

Resolver R1 has windings 13 and 15 comprising quadrature stator windings. The displacement signals ΔX and ΔY are combined by windings 13 and 15, to produce a resulting field having an angle corresponding to the angle θ (FIG. 3) which is determined by the straight line direction from the actual position of the tool part to the succeeding preselected target position thereof Saddle 10 and table 11 are arranged to be driven along their respective axes by servo drives 16 and 17, respectively. Motors 16 and 17 can comprise any suitable servo drives providing an output speed proportional to input voltage.

The rate of feed of the tool part is determined by the rate of feed input signal transmitted via lead 18 and potentiometer 19 to armature winding 20 of a speed direction, second resolver R2. Resolver R2 is essentially identical with resolver R1, except that it requires only the one armature winding 20, while resolver R1 has a second, quadrature armature winding 30 for a purpose to be described. Like resolver R1, resolver R2 has quadrature stator windings 21 and 22, which resolve the feed rate signal across armature winding 20 into X axis and Y axis components, respectively. These rate of feed components are transmitted via leads 23 and 24 to the X and Y servo drives 16 and 17, which can be provided with signal amplifiers, not shown. Thus, resolver R2 by determining the relative breakdown of the rate of feed signal into its axial components, determines the direction of movement of the tool part. Resolver R2 is controlled by resolver R1, to cause the direction of movement to coincide with the target direction, as follows.

As previously noted, resolver R1 computes the resultant angle or linear direction from the actual tool position to the next target position thereof. If the angular position of armature winding 25 of resolver R1 does not coincide with the resultant field angle of resolver R1, an error signal is produced across winding 25 and transmitted via lead 26 to a signal amplifier 27 of conventional design. This error signal has a magnitude corresponding to the extent of angular displacement of winding 25 from the field angle, $\theta$, and a polarity corresponding to the direction of such displacement.

The amplified signal is transmitted via lead 28 to a zeroing servo motor 29, which is mechanically connected to the armature windings of resolver R1 and is energized by the amplified signal to turn resolver winding 25 until it coincides with the resultant field angle of resolver R1, whereupon no signal is in winding 25 and motor 29 stops. Thus zeroing alinement is substantially instantaneous, and because armature winding 20 of direction resolver R2 is mechanically connected to armature winding 25 of angle computing resolver R1, it also will be turned and zeroed into alinement with the angle $\theta$, to define a speed direction corresponding to the direction of movement from the actual position to the target position.

Thus, assume that the tool is at a first position X1, Y1 (FIG. 3), and that the tape reader 1 has fed X2, Y2 information, defining the next target position, to the relay groups 3 and 4. A signal $\Delta X$, corresponding to the displacement along the X axis, will be transmitted via lead 12 to the first resolver winding 13, while the displacement signal $\Delta Y$ will be fed via lead 14 to resolver winding 15. Windings 13 and 15 establish a resulting field angle $\theta$ which defines the direction of straight line movement from position X1, Y1 to position X2, Y2. The actual tool movement is determined by the feed rate signal components to servo motors 16 and 17 under control of resolver R2. Any deviation of the tool from its intended straight line movement is immediately corrected, because much deviation establishes a new field angle, producing in winding 25 a signal driving zeroing servo 29 to aline speed direction resolver R2 with the new field angle. The direction from the tool to its target is constantly being computed, and the speed direction is continuously and instantaneously brought in conformance therewith.

With the system of our invention, the tool movement is linear, and a curved contour is only approximated by a series of secants. It has been proposed to change the direction of movement of the tool gradually and continuously, so that its movement will be curvilinear instead of along a secant. However, we have determined that curving in this manner is not controllable, and that better results are produced by zeroing the tool on the target instantaneously, and causing it to traverse a constantly controlled series of straight lines.

LOCKOUT CONTROL FOR READING

While tape reader 1 can read tape 2 extremely quickly, and the relay modules are of a high speed variety, it nonetheless requires a finite time to set up the relay groups 3 and 4. Indeed, with such groups the elements 5 and 5' are set up digit by digit thereby defining an intermediate series of false target positions. The displacement signals $\Delta X$ and $\Delta Y$ resulting from unbalancing of the bridges during this set-up time would be extremely misleading, and if the system were to operate as described above it is obvious that the tool would be uncontrolled during this transition period. Such undesired lack of control is avoided with the system of our invention, as follows.

A signal $E_N$, corresponding in amplitude to the magnitude of displacement of the tool from the target position, is derived by a second, quadrature armature winding 30 of resolver R1. This signal $E_N$ is transmitted to a lockout control circuit, the details of which are shown in FIG. 2. Another signal $E_B$ is derived from the rate of feed input, as determined by potentiometer 19 and also is fed into the lockout control circuit. A lockout relay 31 is energized by the difference between signal voltages $E_N$ and $E_B$, whereby when $E_N$ equals $E_N$, relay 31 is deenergized to lock zeroing servo 29 in its last corrected position, as will be described.

Referring now to the detailed lockout control circuit of FIG. 2, it will be seen that displacement signal $E_N$ derived through armature winding 30 as transmitted via leads 33 and 34 to a rectifier bridge 35 which is connected, by leads 36 and 37, across a smoothing and filtering network comprising condensers 38 and 39 and inductance 40. The rate of feed signal $E_B$ is transmitted via leads 41 and 42 to a transformer 43. The secondary of transformer 43 is connected across a rectifier bridge 35' which in turn is connected by leads 36' and 37' across a smoothing and filtering network comprising condensers 38' and 39' and inductance 40'. A load resistance 44 is connected across the output side of smoothing and filtering network 38'-40'. The two signal networks are identical, and are arranged in opposition across lockout relay 31, whereby the latter is energized by the difference signal $E_N - E_B$. $E_N$ decreases as the tool approaches the target position X2Y2 (FIG. 4), and when it no longer exceeds $E_B$, relay 31 will be deenergized and drop out. This results in locking the zeroing servo 29 in its last corrected position, as will be described.

Blocking rectifier 45 prevents null relay 31 from becoming re-energized when $E_B$ is greater than $E_N$, and a protecting by pass circuit is provided in the form of a pair of blocking rectifiers 46 which are arranged in parallel with relay 31, to limit the energization thereof. A smoothing condenser 47 is placed across rectifiers 46.

When relay 31 drops out, it opens a switch 32, deenergizing a relay 48 which moves a switch 49 which first opens the signal circuit via lead 26, and then grounds the zeroing servo 29 via lead 26', thereby locking motor 29 in its corrected position. Because this occurs only as the tool approaches its target, it will have been zeroed on the target and will therefore be locked in the correct heading. Relay 50 will have been deenergized, by the absence of an error signal in resolver winding 25, thereby opening switch 51 in the energizing circuit of relay 48.

Deenergization of relay 48 also closes switch 52 to energize relay 53, which then opens switch 54 to deenergize relay groups 3 and 4, thereby clearing them of all previously stored information. This also deenergizes relays 55 and 56, which latter opens switch 57 to deenergize relay 53. This closes switch 54 to reenergize relay 55 which sends a signal via lead 58 causing reader 1 to commence reading tape 2.

The new information is stored in relay groups 3 and 4 until all but the last two digits have been read, at which time a signal is transmitted via lead 59 to energize relay 60. This closes switch 61 to energize relay 48 via switch 62 and either switch 32 or switch 51. Relay 48 closes switch 72 to complete a holding circuit.

Normally, lockout relay 31 will be energized to close switch 32 and thereby complete the energizing circuit to relay 48. However, if the new target position were at a right angle to the tool part, there would be no signal across armature winding 30, and relay 31 would not be energized. The tool part then would continue to be driven in the direction determined by the locked out motor 29.

To accommodate this special situation, relay 50 is provided. This relay is energized by the signal across armature winding 25, and when the field angle in resolver R1 is at right angles to winding 25, and therefore coincident with winding 30, it will induce a maximum error signal in winding 25 and relay 50. This closes switch 51 to complete the energizing circuit to relay 48. Motor 29 also will be energized, to drive winding 25 into coincidence with the resolver field angle, and as this occurs winding 30, and consequently relay 31, are enregized and then deenergized in accordance with displacement, in the manner described above:

Relay 63 is energized by a signal from the reader 1 via lead 64, as the last digit is read, and closes switch 65 to energize relay 56 for the start of a new cycle. Relay 56 closes a switch 66, to complete a holding circuit.

Thus, the tool drives are locked in, a short time prior to arrival of the tool at its target position. The tool part therefore continues to move in a controlled manner during the period while the analog inputs are being established and cannot control. The time during which the analog input control is locked out is a function of the rate of feed, being selected so that the analog definitions of the next target position will be completely established by the time the tool arrives at the previous target position, and being variable with variations in the rate of feed, which can be varied by adjusting potentiometer 19.

OFFSET OPERATION

Sometimes it will be desired to contour a path offset from the path defined by the digital information on tape 2, as when undercutting or overcutting. The system of our invention can be operated to provide a selectively variable extent and direction of offset, as follows.

Referring now to FIG. 3, let it be assumed that it is desired to traverse the phantom path $X'_1$, $Y'_1$, $X'_2$, $Y'_2$, $X'_3$, $Y'_3$. This path is offset to one side of the tape defined path $X_1Y_1$, $X_2Y_2$, $X_3Y_3$ by a fixed amount $\Delta X'$, $\Delta Y'$. This offset displacement is produced by selected energization of the quadrature stator windings 67 and 68 of a third resolver R3 which windings are in series with the angle computing windings 13 and 15. The armature winding 69 of resolver R3 is energized via lead 70 and potentiometer 71 which latter is calibrated in terms of inches of offset. Therefore, by adjusting potentiometer 71 to the desired extent of offset, an offset signal corresponding in amplitude to the extent of offset, and in polarity to the direction of offset, is produced in winding 69. This signal is resolved by windings 67 and 68 into its X axis and Y axis components, and these are added to or subtracted from the signals $\Delta X$ and $\Delta Y$ passing to the stator windings 13 and 15.

Armature winding 69 of offset resolver R3 is mechanically connected to armature winding 25 of angle computing resolver R1, to have the same relative alinement and thereby correctly offset the tool. Winding 69 being thus connected to motor 29, the tool part is thereby continuously corrected as to the offset path in the same manner as to the tape indicated path.

Thus, windings 67 and 68 function as bias windings for the angle computing resolver R1. By adjusting potentiometer 71, the desired amount of offset will be provided, without altering the tape 2 or its reader 1 in any way.

By reversing the polarity of the offset signal to winding 69, an offset in the opposite direction, on the other side of the tape defined path, will be provided.

Accordingly, it is seen that our invention has fully accomplished its intended objects. While we have disclosed in detail only one embodiment of our invention, that has been done by way of illustration only, without thought of limitation. Also, although only two axes of movement have been discussed herein, a third can be provided.

Having fully disclosed and completely described our invention and its mode of operation, what we claim as new is:

1. A machine control system comprising a machine part movable along plural axes, means defining a target position, means for driving said machine part along said axes to said target position, means generating a first signal corresponding to the displacement of said machine part from said target position along one of said axes, means generating a second signal corresponding to the displacement of said machine part from said target position along another of said axes, first resolver means resolving said first and second signals into the direction from said machine part to said target position, means generating a third signal corresponding to the rate of feed of said machine part, second resolver means resolving said third signal into components corresponding to said axes, said driving means being responsive to said third signal components, direction correcting means responsive to said first resolver means and arranged in controlling relation to said second resolver means, and means automatically operable upon arrival of said machine part at a point a predetermined distance in advance of said target position for locking said second resolver correcting means in position and thereby causing said machine part to continue in its last corrected direction until arrival of said machine part at said target position.

2. A machine control system as set forth in claim 1, together with means producing a fourth signal corresponding to the displacement of said machine part from said target position, said locking means being responsive to the difference between said fourth signal and a signal derived from the rate of feed of said machine part.

3. A machine control system as set forth in claim 2, together with means for selectively varying the rate of feed of said machine part.

4. A machine control system as set forth in claim 1, together with means causing said machine part to traverse a path offset from that called for by said target defining means, said offsetting means including means generating a fourth signal corresponding to the offset desired, and third resolver means resolving said fourth signal into components corresponding to said axes, said third resolver means being arranged in biasing relation to said first resolver means and in controlled relation to said direction correcting means.

5. A machine control system as set forth in claim 1, together with means for causing said machine part to traverse a path offset from that defined by said target defining means, said offsetting means including means biasing said first and second signals in accordance with the offset desired.

6. A machine control system as set forth in claim 5, wherein said signal biasing means includes third resolver means, and means generating a fourth signal corresponding to the offset desired, said third resolver means resolving said fourth signal into components corresponding to said axes.

7. A machine control system as set forth in claim 6, wherein said fourth signal generating means is adjustable, thereby to selectively vary the offset of the actual path traversed by said machine part from the path called for by said target defining means.

8. A machine control system as set forth in claim 6, wherein said third resolver means is connected to said first resolver means for resolution of said fourth signal in accordance with the resolution of said first and second signals.

9. A machine control system as set forth in claim 2, wherein said direction correcting means have an energizing circuit including a first quadrature armature winding in said first resolver means, said fourth signal producing means including a second quadrature armature winding in said first resolver means, said locking means being arranged in controlling relation to said direction correcting energizing circuit, said first resolver means having quadrature field windings resolving said first and second signals into a resultant field angle defining the direction from said part to said target position, said direction correcting means moving said first resolver means to bring said first quadrature armature into coincidence with said resultant field angle, and means including said first quadrature armature winding for completing said direction correcting energizing circuit when the signal across said second quadrature armature winding is insufficient to do so due to substantial coincidence of said second quadrature armature winding with said resultant field angle.

References Cited by the Examiner

UNITED STATES PATENTS 2,784,359   3/57   Kamm.
2,900,586   8/59   Spencer et al.
2,961,161   11/60  Spencer et al.

FOREIGN PATENTS 841,682   7/60   Great Britain.

WILLIAM W. DYER, JR., *Primary Examiner.*
LEON PEAR, *Examiner.*